(12) United States Patent
Gu et al.

(10) Patent No.: US 9,896,350 B2
(45) Date of Patent: Feb. 20, 2018

(54) METHOD OF DEGRADING PERFLUORINATED COMPOUND

(71) Applicant: NANJING UNIVERSITY, Nanjing (CN)

(72) Inventors: Cheng Gu, Nanjing (CN); Haoting Tian, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 15/382,719

(22) Filed: Dec. 18, 2016

(65) Prior Publication Data

US 2017/0183246 A1    Jun. 29, 2017

(30) Foreign Application Priority Data

Dec. 23, 2015  (CN) .......................... 2015 1 0981853

(51) Int. Cl.
  *C02F 1/32*  (2006.01)
  *C02F 1/28*  (2006.01)
  (Continued)

(52) U.S. Cl.
  CPC .............. *C02F 1/325* (2013.01); *C02F 1/286* (2013.01); *C02F 2101/14* (2013.01);
  (Continued)

(58) Field of Classification Search
  CPC .... C02F 1/70; C02F 1/325; C02F 1/66; C02F 2101/14; C02F 1/286; C02F 2209/06;
  (Continued)

(56) References Cited

U.S. PATENT DOCUMENTS

| | | | |
|---|---|---|---|
| 7,713,496 B2 * | 5/2010 | Harris | B82Y 30/00 210/663 |
| 9,694,401 B2 * | 7/2017 | Kerfoot | B09C 1/08 |

OTHER PUBLICATIONS

Polymer Degradation and Stability 87 (2005) p. 535-542: Polylactide/montmorillonite nanocomposites: study of the hydrolytic degradation; M.-A. Paula, , C. Delcourta. , M. Alexandrea; accepted Oct. 23, 2004 Available online Dec. 8, 2004 (Year: 2005).*

* cited by examiner

*Primary Examiner* — Walter D. Griffin
*Assistant Examiner* — Cameron J Allen

(57) ABSTRACT

The present disclosure relates to the technical field of degradation of persistent pollutants and discloses a method for efficiently degrading a perfluorinated compound (PFC), through which the problems of harsh reaction conditions and less high defluorination rate existing in prior-art methods for degrading PFCs are solved. In the present disclosure, a 3-indoleacetic acid (IAA) solution is irradiated with 254 nm UV light to generate hydrated electrons, with which the PFC are degraded by reduction under an aerobic condition, where an organo-modified montmorillonite is added to provide a reaction microzone, so the degradation and defluorination effects of the hydrated electrons for the PFC are greatly improved. The method for degrading a PFC according to the present disclosure is not affected by the pH of and the dissolved oxygen in the solution and less affected by the humic substances in a water body, thereby overcoming the defects in existing methods for degrading PFCs with hydrated electrons while the degradation efficiency is ensured. Therefore, the present disclosure is of great application value.

10 Claims, 9 Drawing Sheets

(51) Int. Cl.
*C02F 101/14* (2006.01)
*C02F 101/30* (2006.01)
*C02F 101/36* (2006.01)

(52) U.S. Cl.
CPC .... *C02F 2101/301* (2013.01); *C02F 2101/36* (2013.01); *C02F 2201/3225* (2013.01); *C02F 2209/02* (2013.01); *C02F 2209/06* (2013.01)

(58) Field of Classification Search
CPC ............ C02F 2101/301; C02F 2101/36; C02F 2209/02; C02F 1/32
See application file for complete search history.

METHOD OF DEGRADING PERFLUORINATED COMPOUND

CROSS REFERENCE TO RELATED PATENT APPLICATIONS

This application claims priority to Chinese Patent Application No. 201510981853.2, filed on Nov. 23, 2015, entitled "Method for degrading perfluorinated compound," which is hereby incorporated by reference in its entirety.

TECHNICAL FIELD

This. The present disclosure relates to the technical field of degradation of persistent pollutants, and more particularly to a method for efficiently degrading a perfluorinated compound (PFC).

BACKGROUND

Due to the excellent thermal and chemical stability, PFCs are widely used in industrial production, for example, in the fields of polymer synthesis, papermaking, textiles, electroplating and fire retardants (Renner, R. Growing Concern over Perfluorinated Chemicals. Environ. Sci. Technol. 2001, 35, 154A-160A; Moody, C. A.; Field, J. A. Perfluorinated Surfactants and the Environmental Implications of Their Use in Fire-Fighting Foams. Environ. Sci. Technol., 2000, 34(18), 3864-3870; and Giesy, J. P.; Kannan, K. Perfluorochemical Surfactants in the Environment. Environ. Sci. Technol., 2002, 36(7), 146A-152A). With the increasing production and use, some PFCs, particularly perfluorooctanoic acid (PFOA) and perfluorooctane sulfonate (PFOS) are extensively detected in the environment (water, soil, and dust), and even in the serum and breast milk of human at a high concentration (Giesy, J. P.; Kannan, K. Global distribution of perfluorooctane sulfonate in wildlife. Environ. Sci. Technol., 2001, 35(7), 1339-1342; A. Quantitative Characterization of Trace Levels of PFOS and PFOA in the Tennessee River. Environ. Sci. Technol., 2002, 36(4), 545-551; and Hansen, K. J.; Johnson, H. O.; Eldridge, J. S.; Butenhoff, J. L.; Dick, L. A. Exploring Indirect Sources of Human Exposure to Perfluoroalkyl Carboxylates (PFCAs): Evaluating Uptake, Elimination, and Biotransformation of Polyfluoroalkyl Phosphate Esters (PAPs) in the Rat. Environ Health Perspect., 2011, 119(3), 344-350). This class of substances is persistent pollutants. Research suggests that PFOA and PFOS can cause liver damage, and have genotoxicity, reproductive toxicity, and carcinogenicity. They can be enriched in the food chain, and pose a great threat to human and animal health (Midgette, K.; Peden-Adamsb, M. M.; Gilkesonc, G. S.; Kamenc, D. L. In vitro evaluation of the effects of perfluorooctanesulfonic acid (PFOS) and perfluorooctanoic acid (PFOA) on IL-2 production in human T-cells. J. Appl. Toxicol., 2015, 35, 459-465).

PFCs cannot be degraded by conventional chemical and biological treatment process due to the high C-F reduction potential ($F+e^- \rightarrow F^-$, $E_0=3.6V$) and the large bond energy (Vecitis, C. D.; Park, H.; Cheng, J.; Mader, B. T.; Hoffman, M. R. Treatment technologies for aqueous perfluoro octane sulfonate (PFOS) and perfluorooctanoate (PFOA). Frontiers of Environmental Science & Engineering in China. 2009, 3(2), 129-151). Researchers have proposed many methods for the degradation of PFCs such as electrochemical oxidation, ultrasonic degradation, photocatalytic oxidation, and reduction with hydrated electrons (Moriwaki, H.; Takagi, Y.; Tanaka, M.; Tsuruho, K.; Okitsu, K.; Maeda, Y. Sonochemical Decomposition of Perfluorooctane Sulfonate and Perfluorooctanoic Acid. Environ. Sci. Technol., 2005, 39(9), 3388-3392; Lin, H.; Niu, J. F.; Ding, S. Y.; Zhang, L. L. Electrochemical degradation of perfluorooctanoic acid (PFOA) by $Ti/SnO_2$—Sb, $Ti/SnO_2$—Sb/$PbO_2$ and $Ti/SnO_2$—Sb/$MnO_2$ anodes. Water. Research, 2012, 46(7), 2281-2289; Qu, Y., Zhang, C. J.; Li, F.; Chen, J.; Zhou, Q. Photo-reductive defluorination of perfluorooctanoic acid in water. Water. Research. 2010, 44(9), 2939-2947; and Song, Z.; Tang, H. Q.; Wang, N.; Zhu, L. H. Reductive defluorination of perfluorooctanoic acid by hydrated electrons in a sulfite-mediated UV photochemical system. Journal of Hazardous Materials. 2013, 262, 332-338). In these methods, electrochemical oxidation and reduction with hydrated electrons have a high application prospect. Studies show that the PFCs can be rapidly degraded and mineralized on the anode during degradation by electrochemical oxidation. However, the electrochemical process also suffers from notorious disadvantages, for example, short electrode life and the need for adding a high concentration of background electrolyte during the degradation process. The reduction with hydrated electrons has advantages of thorough degradation for PFCs and high defluorination rate. For example, Chinese Patent Application No. 200910051114.8 published on Nov. 17, 2010, discloses a method for degrading PFCs by defluorination through photoreduction, that is, a method for degrading PFCs by reduction with hydrated electrons produced from KI under irradiation. In the method, the PFCs are placed in a reaction vessel fitted with a UV lamp, then a reductive material is fed to the reaction vessel via a feed port, and the PFCs are degraded and defluorinated by reacting with the reductive material under UV irradiation. Under optimum conditions, the degradation rate for PFOA is nearly 100%, and the defluorination rate is 95% or higher. However, in the degradation of PFCs in this patent, an anaerobic condition is needed, and the reaction solution is required to be alkaline, which increases the treatment cost in effective pollution treatment and reduces the operability considerably. Therefore, there is a need for developing a method for efficiently degrading PFCs, which is convenient for use in practice.

SUMMARY

1. Problem to be Solved

In view of the problems of harsh reaction conditions, high treatment cost, and poor operability existing in prior-art methods for degrading PFCs, the present disclosure provides a method for efficiently degrading a PFC, in which the PFC is degraded under an aerobic condition with an organo-montmorillonite as a reaction medium. Hydrated electrons are generated by irradiating 3-indoleacetic acid (IAA) with UV light. The natural montmorillonite is organically modified, to greatly increase the adsorption of the PFC and IAA by montmorillonite, such that the PFC is degraded by reduction with hydrated electrons interlamellar in the organo-montmorillonite. This not only improves the utilization of hydrated electrons but also inhibits the consumption of hydrated electrons by oxygen and hydrogen ions in solution by virtue of the special properties of the organo-montmorillonite. As a result, the degradation of PFC by reduction with hydrated electrons is achieved under aerobic and acidic conditions. The montmorillonite is a clay mineral abundant in the natural environment. When used as a reaction medium in the treatment of environment pollution, the negatively charged nature of montmorillonite disables the release of interlamellar HDTMA, thus causing no secondary pollution. Moreover, IAA is a substance widely present in nature. Therefore, the present method is environmentally friendly.

2. Technical Solution

A for the above problems, the following technical solutions are adopted in the present disclosure.

A method for efficiently degrading a perfluorinated compound (PFC) is provided, which comprises (a) organically modifying montmorillonite with hexadecyl trimethyl ammonium bromide, to obtain an organo-montmorillonite;

(b) uniformly mixing a solution of the PFC to be degraded with a 3-indoleacetic acid (IAA) solution, then adding the organo-montmorillonite, and stirring to obtain a mixed solution; and (c) irradiating the mixed solution obtained in Step (b) by using a low-pressure mercury lamp under an aerobic condition to enable the degradation and defluorination of the PFC.

Preferably, the organically modifying montmorillonite in Step (a) comprises:

(1) dispersing sodium montmorillonite in water;

(2) adding a hexadecyl trimethyl ammonium bromide solution to the dispersed solution in Step (1), and stirring;

(3) centrifuging after the stirring in Step (2) is completed, and discarding the supernatant, to obtain a precipitate; and (4) washing the precipitate obtained in Step (3) with water, to obtain an $HDTMA^+$ loaded montmorillonite.

Preferably, Step (b) specifically comprises (i) uniformly mixing the IAA solution and the solution of the PFC to be treated;

(ii) dispersing the organo-montmorillonite obtained in Step (a) in the solution in Step (i) and adjusting the pH of the solution, where the weight ratio of the organo-montmorillonite to IAA is (7.5-16.6):1; and (iii) stirring the reaction solution in Step (ii) for 30-40 min.

Preferably, the degradation in Step (c) is carried out with the low-pressure mercury lamp immersed in the mixed solution.

Preferably, the dispersing time in Step (1) is 8 hrs.

Preferably, the total amount of hexadecyl trimethyl ammonium bromide added in Step (2) is in accord with the cation exchange capacity of the montmorillonite in the solution.

Preferably, the stirring time in Step (2) is 24 hrs.

Preferably, in Step (ii), the pH of the solution is adjusted to 4.0-10.0.

Preferably, the degradation temperature is controlled at 15-35° C., the low-pressure mercury lamp is a 36 W mercury lamp, the reaction time is 1-10 hrs; and the weight ratio of IAA to PFC in the reaction solution is 17:1.

Preferably, the reactions are all carried out under an aerobic condition.

The principle of the present disclosure is as follows. Montmorillonite is a layered mineral material with interlamellar negative charges, in which cations are adsorbed in the interlamellar space to counteract the negative charges. When the interlamellar negative charges are counteracted with $HDTMA^+$ ions (hexadecyl trimethyl ammonium ions), an organo-montmorillonite is obtained. $HDTMA^+$ has a long C chain, and imparts hydrophobicity to the organo-montmorillonite, thus greatly increasing the adsorption of hydrophobic organics by the montmorillonite. By virtue of the property of the organo-montmorillonite, a PFC and IAA are adsorbed into the interlamellar space of montmorillonite. IAA adsorbed in the interlamellar space is photoionized under UV irradiation, to produce hydrated electrons with which the PFC also adsorbed into the interlamellar space is degraded rapidly through defluorination by reduction.

During degradation by reduction of PFCs with hydrated electrons, the presence of organo-montmorillonite greatly increases the utilization rate of hydrated electrons. After the photoionization of IAA, IAA cation radicals and hydrated electrons are produced, and the hydrated electrons are in turn quenched rapidly by undergoing charge combination with the IAA cation radicals. However, in the interlamellar space of montmorillonite, due to the presence of natural interlamellar negative charges, the produced radical cations are stabilized, thus inhibiting the charge combination. As a result, more hydrated electrons are involved in the degradation of PFCs. Furthermore, because the reaction takes place in a limited interlamellar space of the montmorillonite, the opportunity of the PFCs to contact the hydrated electrons is increased, whereby the utilization rate of the hydrated electrons produced is greatly increased.

In the presence of organo-montmorillonite, the dissolved oxygen and hydrogen ions in the solution have almost no influence on the degradation. Since the hydrated electrons can be quenched by oxygen and hydrogen ions quickly, the degradation by reduction of a pollutant with hydrated electrons can only take place under an anaerobic and alkaline conditions. The organo-montmorillonite is hydrophobic and can segregate the dissolved oxygen and hydrogen ions in water, such that they are hard to enter the interlamellar space, thus protecting the hydrated electrons produced during the reaction from being quenched by oxygen and hydrogen ions. In addition, the humic acid in water body has a weak influence on the reaction, mainly because the humic acid has a light absorption and shading effect, which attenuate the UV intensity during the reaction. However, the humic acid molecule is large and cannot enter the interlamellar space of montmorillonite, thus causing no influence on the reaction.

IAA used in the reaction is a substance widely existing in nature, and after the reaction, the $HDTMA^+$ ions and by-products produced by IAA can be well immobilized by the organo-montmorillonite, thus being environmentally friendly and causing no secondary pollution to the environment. The organo-montmorillonite further has a good settleability. After stopping stirring after the reaction, the organo-montmorillonite is rapidly settled down to the bottom of the reactor, and thus the reaction solution becomes clear, which is convenient for the design of a reaction process.

3. Beneficial Effect

Compared with the prior art, the present disclosure has the following beneficial effects.

(1) The organo-montmorillonite prepared in the present disclosure is hydrophobic, which greatly increases the adsorption of hydrophobic organics by the montmorillonite. By virtue of such a special property of the organo-montmorillonite, the PFC and IAA are adsorbed and reacted in the interlamellar space of montmorillonite, thereby greatly increasing the utilization rate of hydrated electrons.

(2) In the present disclosure, $HDTMA^+$ ions are adsorbed in the interlamellar space of and impart hydrophobicity to the montmorillonite. As a result, the hydrated electrons produced in the interlamellar space are protected from being quenched by dissolved oxygen and hydrogen ions in water, whereby the degradation can take place under an aerobic condition in a wide range of pH (4-10), and a high degradation and defluorination rate of PFCs can be achieved.

(3) In the present disclosure, the property of montmorillonite is fully utilized. The montmorillonite can be used in the pollution treatment without causing secondary pollution. After the reaction, the montmorillonite is rapidly settled down in a water body, which is convenient for the design of a reaction process.

DETAILED DESCRIPTION

Figure 1:
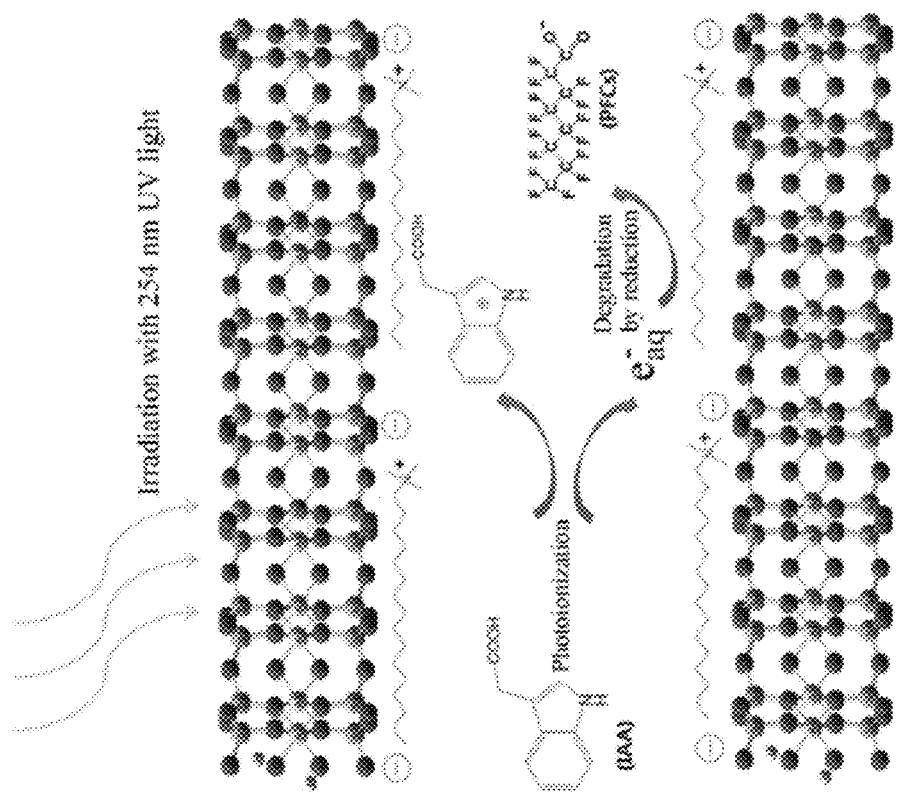
FIG. 1 schematically shows a route for degrading a PFC by interlamellar hydrated electrons in the organo-montmorillonite in the present disclosure.

The present disclosure is further described with reference to specific examples.

Example 1

The adsorption rates of $HDTMA^+$-montmorillonite and $Na^+$-montmorillonite for perfluorooctanoic acid (PFOA) and 3-indoleacetic acid (IAA) were determined. The steps were as follows.

(1) The commercial sodium montmorillonite (purchased from Zhejiang FengHong Clay Chemicals Co. Ltd., cation exchange capacity: 730 mmol/kg) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with water, to obtain an $HDTMA^+$ loaded montmorillonite.

(3) Each 10 mL of the aqueous PFOA solutions having an initial concentration ranging from 0.00483 to 2.415 mmol/L was prepared, and 22 mg $Na^+$-montmorillonite or $HDTMA^+$-montmorillonite was added respectively, agitated at room temperature for 24 hrs, and centrifuged. The PFOA concentration in the supernatant was determined. The adsorption isotherm of the $Na^+$-montmorillonite or $HDTMA^+$ montmorillonite for PFOA was fitted by using the Langmuir model: $q_e=(K_L \times C_{max} \times C_e)/(1+K_L \times C_e)$, where $q_e$ denotes the amount of PFOA or IAA adsorbed onto the montmorillonite (in mmol/kg), $C_e$ denotes the concentration of PFOA or IAA in the solution after adsorption equilibrium (in mmol/L), $K_L$ denotes an adsorption constant (in L/mmol), and $C_{max}$ denotes a maximum adsorption (in mmol/kg). The result shows that the maximum adsorption $C_{max}$ (mmol/kg) of PFOA on the $Na^+$-montmorillonite is 8.199, and is 277.312 on the $HDTMA^+$ montmorillonite. Similarly, each 10 mL of the aqueous IAA solutions having an initial concentration ranging from 0.05 to 2.1 mmol/L was prepared, and 22 mg $Na^+$ montmorillonite or $HDTMA^+$-montmorillonite was added respectively, agitated at room temperature for 24 hrs, and centrifuged. The IAA concentration in the supernatant was determined, and an adsorption isotherm was plotted. The result shows that the maximum adsorption $C_{max}$ (mmol/kg) of IAA on the $Na^+$-montmorillonite is 4.673, and is 70.005 on the $HDTMA^+$-montmorillonite.

Figure 2:
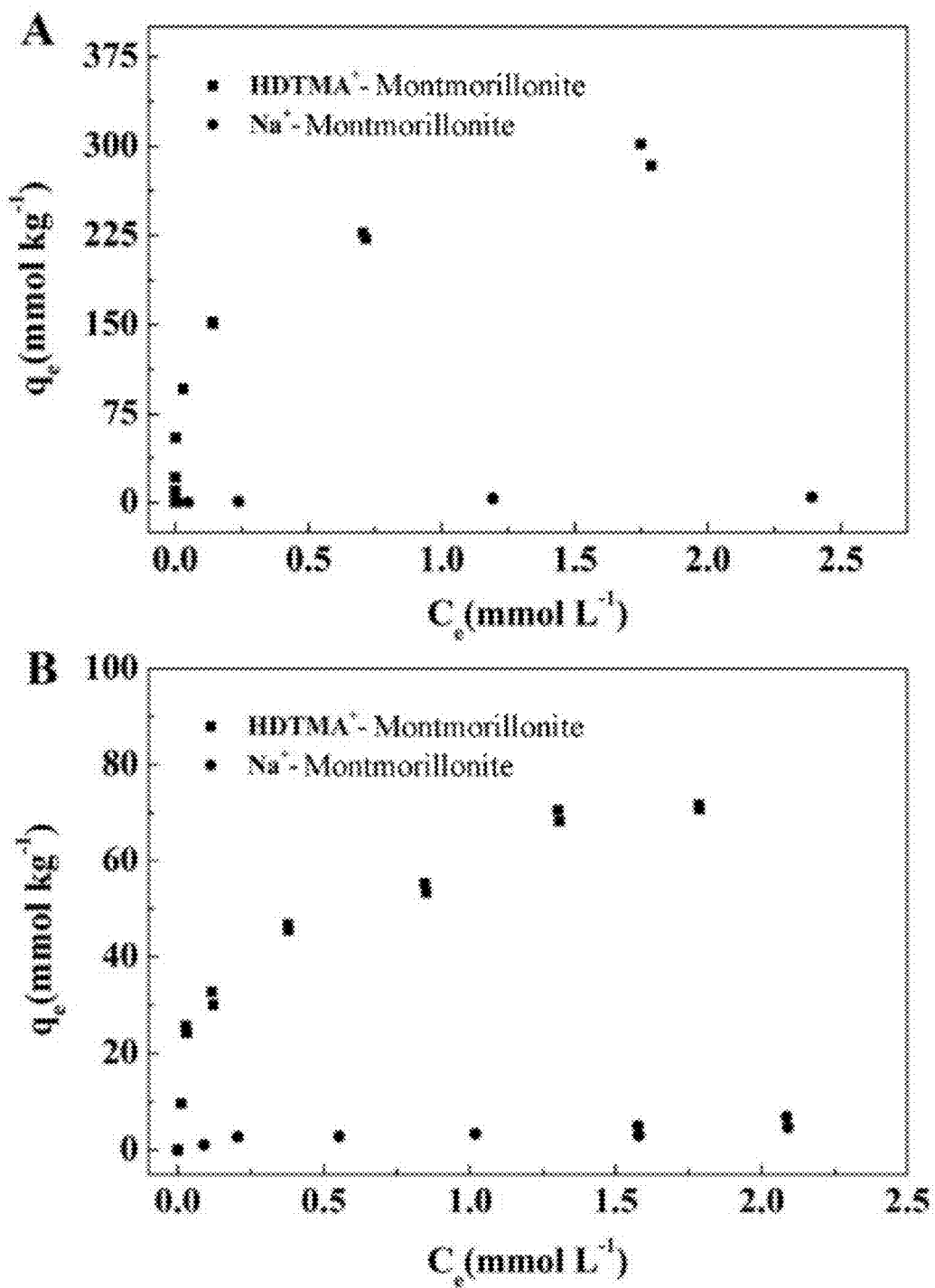
FIG. 2 shows an adsorption isotherm for PFOA and IAA of the organo-montmorillonite in the present disclosure.

It can be concluded that the adsorption of montmorillonite for PFOA and IAA is greatly promoted by organo-modification. The specific adsorption isotherms are shown in FIG. 2, wherein FIG. 2A shows the adsorption of montmorillonite for PFOA and FIG. 2B shows the adsorption of montmorillonite for IAA.

Example 2

A method for efficiently degrading a PFC was as follows.

(1) The commercial sodium montmorillonite (purchased from Zhejiang FengHong Clay Chemicals Co. Ltd.) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with ultrapure water, to obtain an $HDTMA^+$ loaded organo-montmorillonite.

Figure 3:
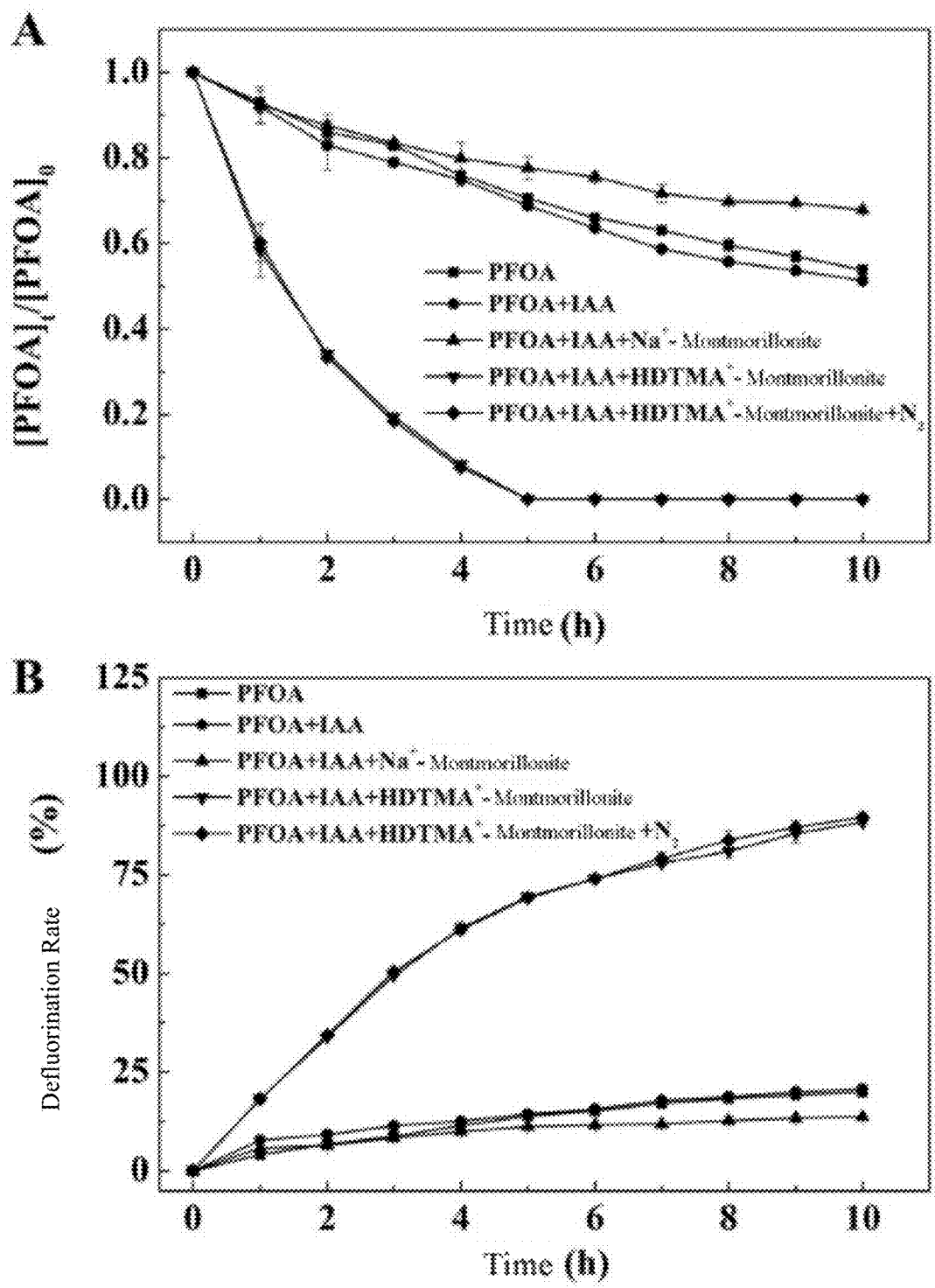
FIG. 3 shows a kinetic curve for degradation of PFOA by hydrated electrons under various reaction conditions in the present disclosure.

(3) Before the degradation by reduction, the formulated IAA solution, and PFOA solution were mixed uniformly. Then, the organo-montmorillonite was dispersed in the solution and adjusted to pH 6.0 with 0.1 mmol/L NaOH and HCl. The formulated reaction solution was magnetically stirred for 30 min and then transferred to a cylindrical glass reactor. Under an aerobic condition, a low-pressure mercury lamp was immersed in the reaction solution and the degradation was initiated. The overall reaction volume was 300 mL, the reaction temperature was controlled at 25±2° C., the light source was a 36 W Philips low-pressure mercury lamp (having a central radiation wavelength of 253.7 nm), the reaction time was 10 hrs, the concentrations of IAA and PFOA in the reaction solution were 1 mmol/L and 10 mg/L respectively, and the concentration of the organo-montmorillonite was 2.2 g/L. 5 mL of the reaction solution was sampled every hour. The sample was divided into two portions, one portion was extracted with two-fold volume of methanol and then determined for the remaining PFOA content by high-performance liquid chromatography (HPLC), and the other portion was filtered and then determined for the content of generated fluoride ions by ion chromatography (IC), from which the degradation and defluorination rates of PFOA were calculated. The specific degradation and defluorination curves are shown in FIGS. 3A and 3B.

It can be concluded that by adding the organo-montmorillonite, the degradation of PFOA by reduction is greatly promoted. After, PFOA is completely degraded, and the defluorination rate can be up to 90% or higher after the 10-hr reaction. Moreover, the reaction is not affected by dissolved oxygen in the solution.

Example 3

A method for efficiently degrading a PFC was as follows.

(1) The commercial sodium montmorillonite (purchased from Zhejiang FengHong Clay Chemicals Co. Ltd.) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with ultrapure water, to obtain an $HDTMA^+$ loaded organo-montmorillonite.

Figure 4:
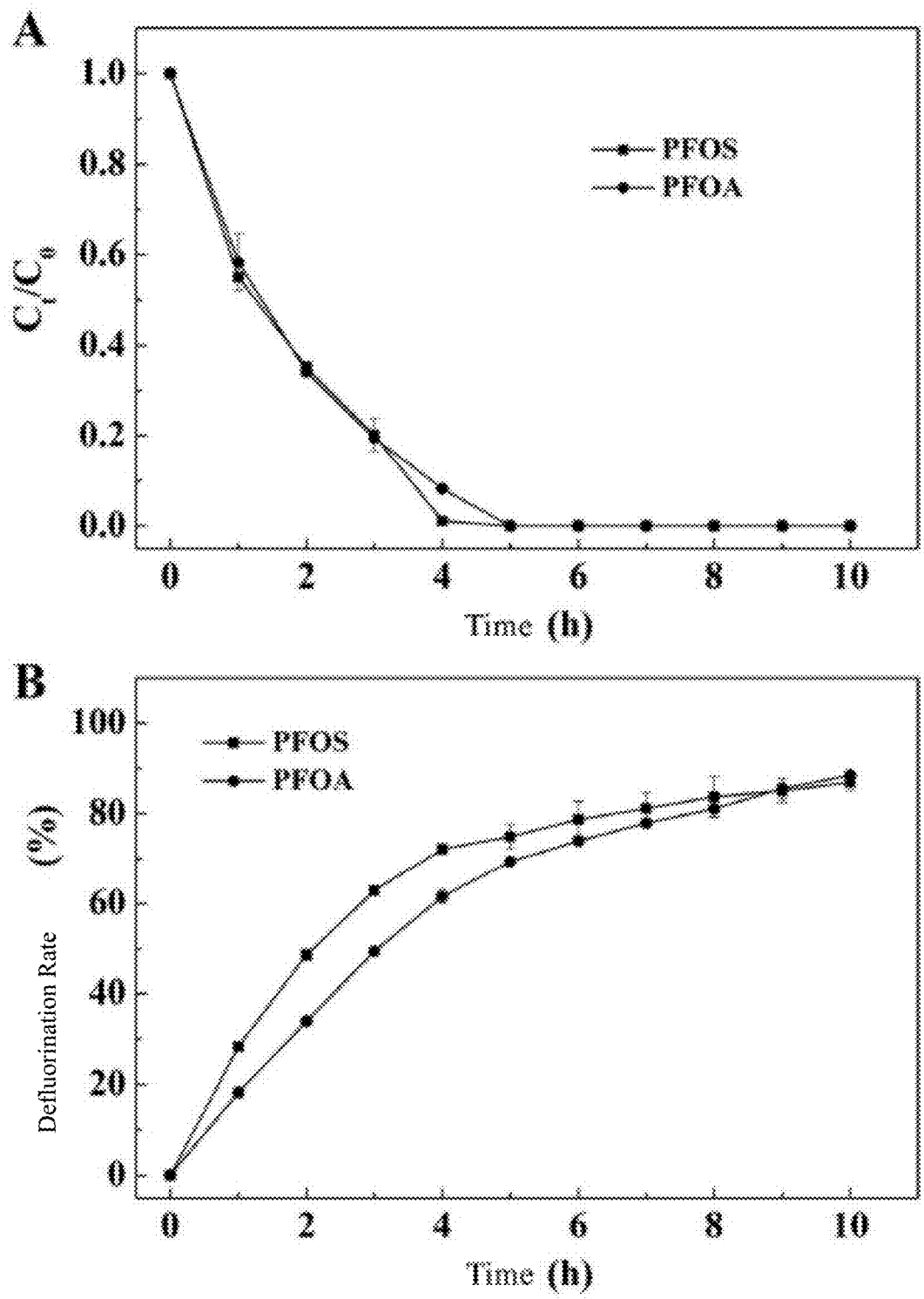
FIG. 4 shows a kinetic curve for degradation of PFOS by hydrated electrons in the present disclosure.

(3) Before the degradation by reduction, the formulated IAA solution, and perfluorooctane sulfonate (PFOS) solution were mixed uniformly. Then, the organo-montmorillonite was dispersed in the solution and adjusted to pH 6.0 with 0.1 mmol/L NaOH and HCl. The formulated reaction solution was magnetically stirred for 30 min and then transferred to a cylindrical glass reactor. Under an aerobic condition, a low-pressure mercury lamp was immersed in the reaction solution and the degradation was initiated. The overall reaction volume was 300 mL, the reaction temperature was controlled at 25±2° C., the light source was a 36 W Philips low-pressure mercury lamp, the reaction time was 10 hrs, the concentrations of IAA and PFOS in the reaction solution were 1 mmol/L and 10 mg/L respectively, and the concentration of the organo-montmorillonite was 2.2 g/L. 5 mL of the reaction solution was sampled every hour. The sample was divided into two portions, one portion was extracted with the two-fold volume of methanol and then determined for the remaining PFOS content by HPLC, and the other portion was filtered and then determined for the content of generated fluoride ions by IC, from which the degradation and defluorination rates of PFOS were calculated. The specific degradation and defluorination curves are shown in FIGS. 4A and 4B.

Compared with Example 2, the degradation and defluorination rates of PFOS in this example have no obvious difference from those of PFOA. Therefore, the method is suitable for the degradation of PFCs.

Example 4

A method for efficiently degrading a PFC was as follows.

(1) The commercial sodium montmorillonite (purchased from Zhejiang FengHong Clay Chemicals Co. Ltd.) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with ultrapure water, to obtain an $HDTMA^+$ loaded organo-montmorillonite.

Figure 5:
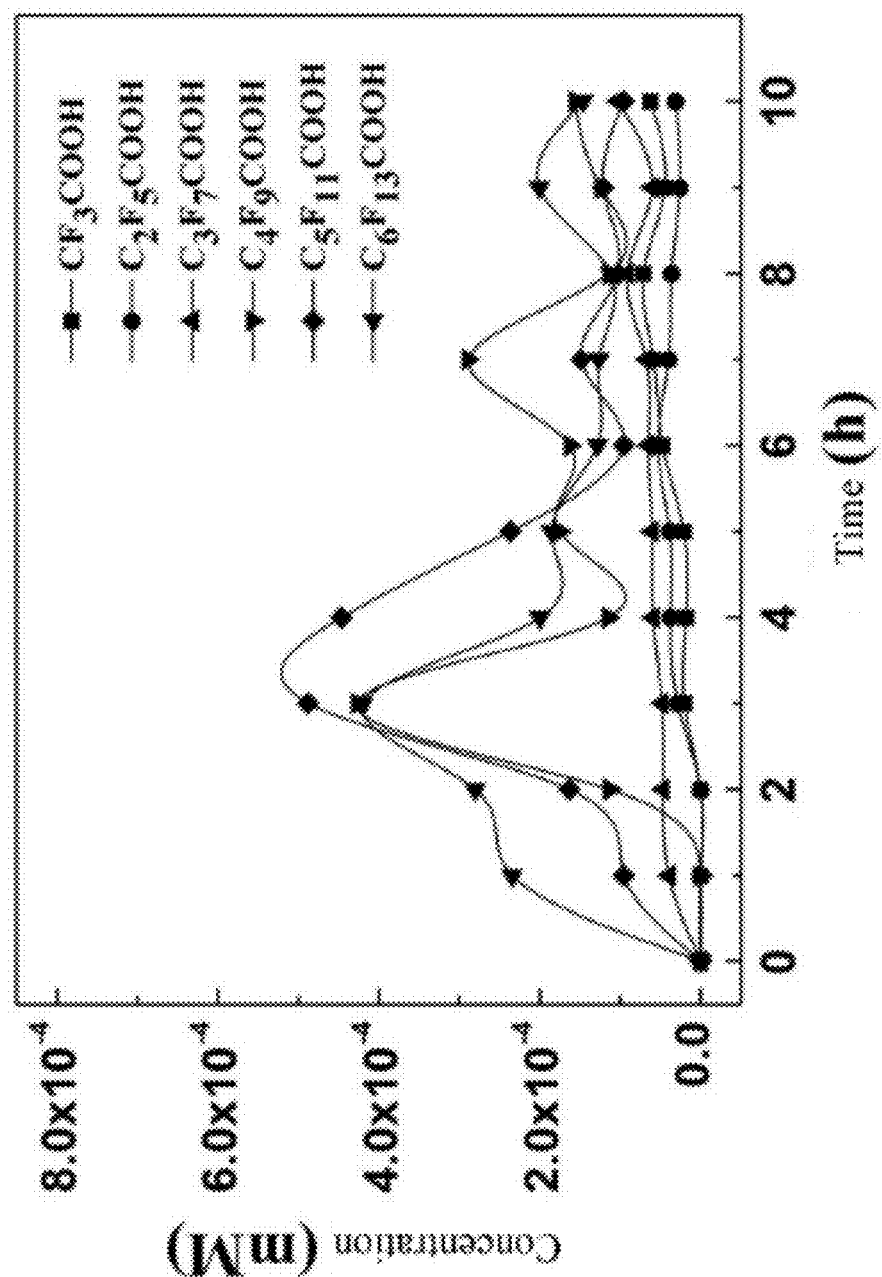
FIG. 5 shows a kinetic curve for production of intermediates in degradation of PFOA by hydrated electrons in the present disclosure.

(3) Before the degradation by reduction, the formulated IAA solution, and PFOA solution were mixed uniformly. Then, the organo-montmorillonite was dispersed in the solution and adjusted to pH 6.0 with 0.1 mmol/L NaOH and HCl. The formulated reaction solution was magnetically stirred for 30 min and then transferred to a cylindrical glass reactor. Under an aerobic condition, a low-pressure mercury lamp was immersed in the reaction solution and the degradation was initiated. The overall reaction volume was 300 mL, the reaction temperature was controlled at 25±2° C., the light source was a 36 W Philips low-pressure mercury lamp, the reaction time was 10 hrs, the concentrations of IAA and PFOA in the reaction solution were 1 mmol/L and 10 mg/L respectively, and the concentration of the organo-montmorillonite was 2.2 g/L. 5 mL of the reaction solution was sampled every hour. The sample was extracted with the two-fold volume of methanol, and then the contents of intermediates produced during the degradation of PFOA were determined by HPLC/MS/MS. Small-molecule perfluorinated compounds were detected, indicating that the degradation is mainly caused by the breakage of carbon-fluorine bonds. The specific degradation curve is shown in FIG. 5.

Example 5

A method for efficiently degrading a PFC was as follows.

(1) The commercial sodium montmorillonite (purchased from Zhejiang FengHong Clay Chemicals Co. Ltd.) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with ultrapure water, to obtain an $HDTMA^+$ loaded organo-montmorillonite.

Figure 6:
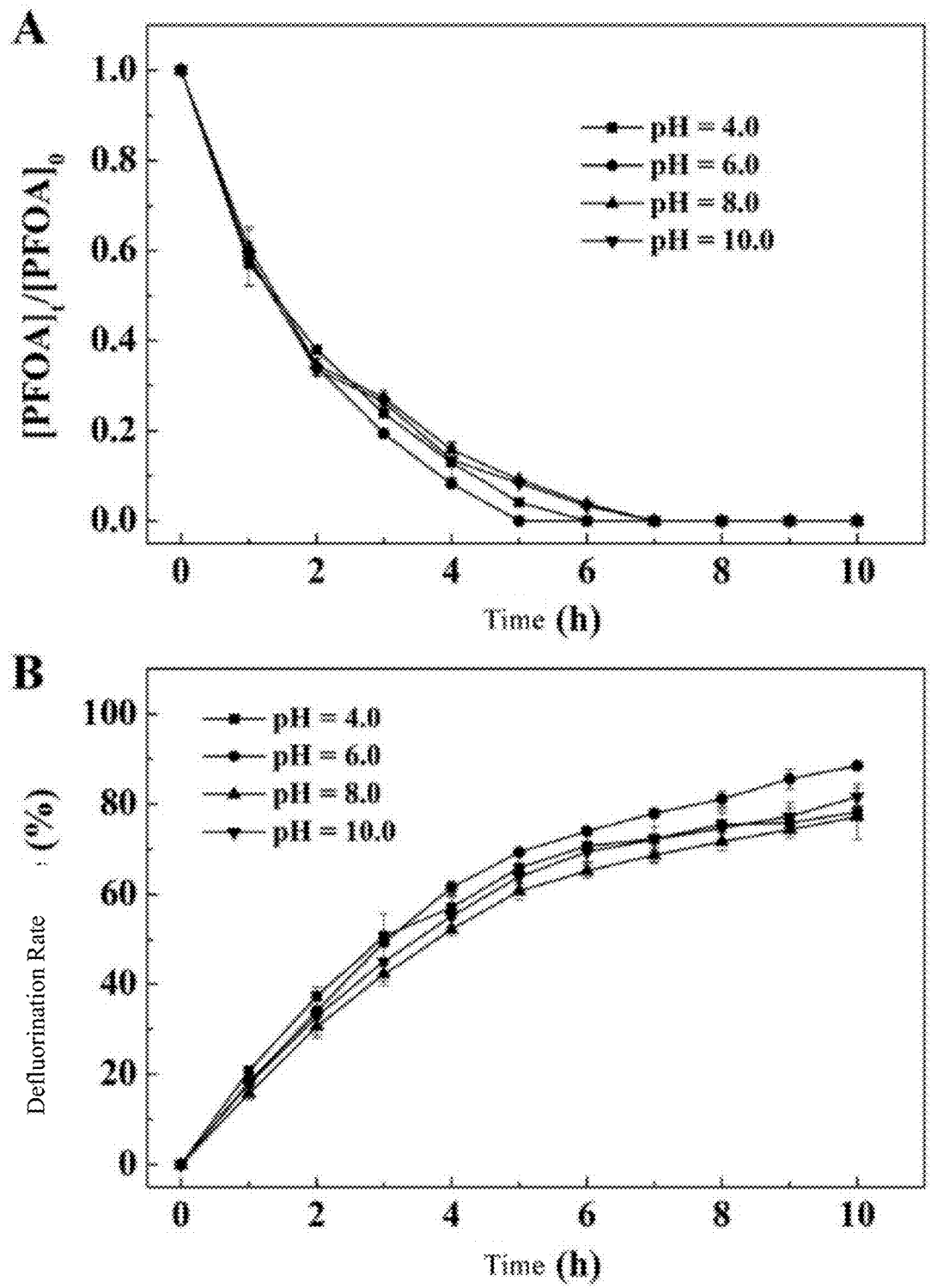
FIG. 6 shows a kinetic curve for degradation of PFOA by hydrated electrons under various pH conditions in the present disclosure.

(3) The degradation efficiency by reduction was investigated under various pH conditions. Before the degradation by reduction, the formulated IAA solution, and PFOA solution were mixed uniformly, to prepare 4 identical mixed solutions of IAA and PFOA. Then, the organo-montmorillonite was dispersed in the 4 mixed solutions and adjusted to pH 4.0, 6.0, 8.0, and 10.0 with 0.1 mmol/L NaOH and HCl respectively. The formulated reaction solution was magnetically stirred for 30 min and then transferred to a cylindrical glass reactor. Under an aerobic condition, a low-pressure mercury lamp was immersed in the reaction solution and the degradation was initiated. The overall reaction volume was 300 mL, the reaction temperature was controlled at 25±2° C., the light source was a 36 W Philips low-pressure mercury lamp, the reaction time was 10 hrs, the concentrations of IAA and PFOA in the reaction solution were 1 mmol/L and 10 mg/L respectively, and the concentration of the organo-montmorillonite was 2.2 g/L. 5 mL of the reaction solution was sampled every hour. The sample was divided into two portions, one portion was extracted with the two-fold volume of methanol and then determined for the remaining PFOA content by HPLC, and the other portion was filtered and then determined for the content of the generated fluoride ions by IC, from which the degradation and defluorination rates of PFOA were calculated. The specific degradation and defluorination curves are shown in FIGS. 6A and 6B.

It can be concluded that the degradation and defluorination of PFOA are scarcely affected by the pH of the solution.

Example 6

A method for efficiently degrading a PFC was as follows.

(1) The commercial sodium montmorillonite (purchased from Zhejiang FengHong Clay Chemicals Co. Ltd.) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with ultrapure water, to obtain an $HDTMA^+$ loaded organo-montmorillonite.

Figure 7:
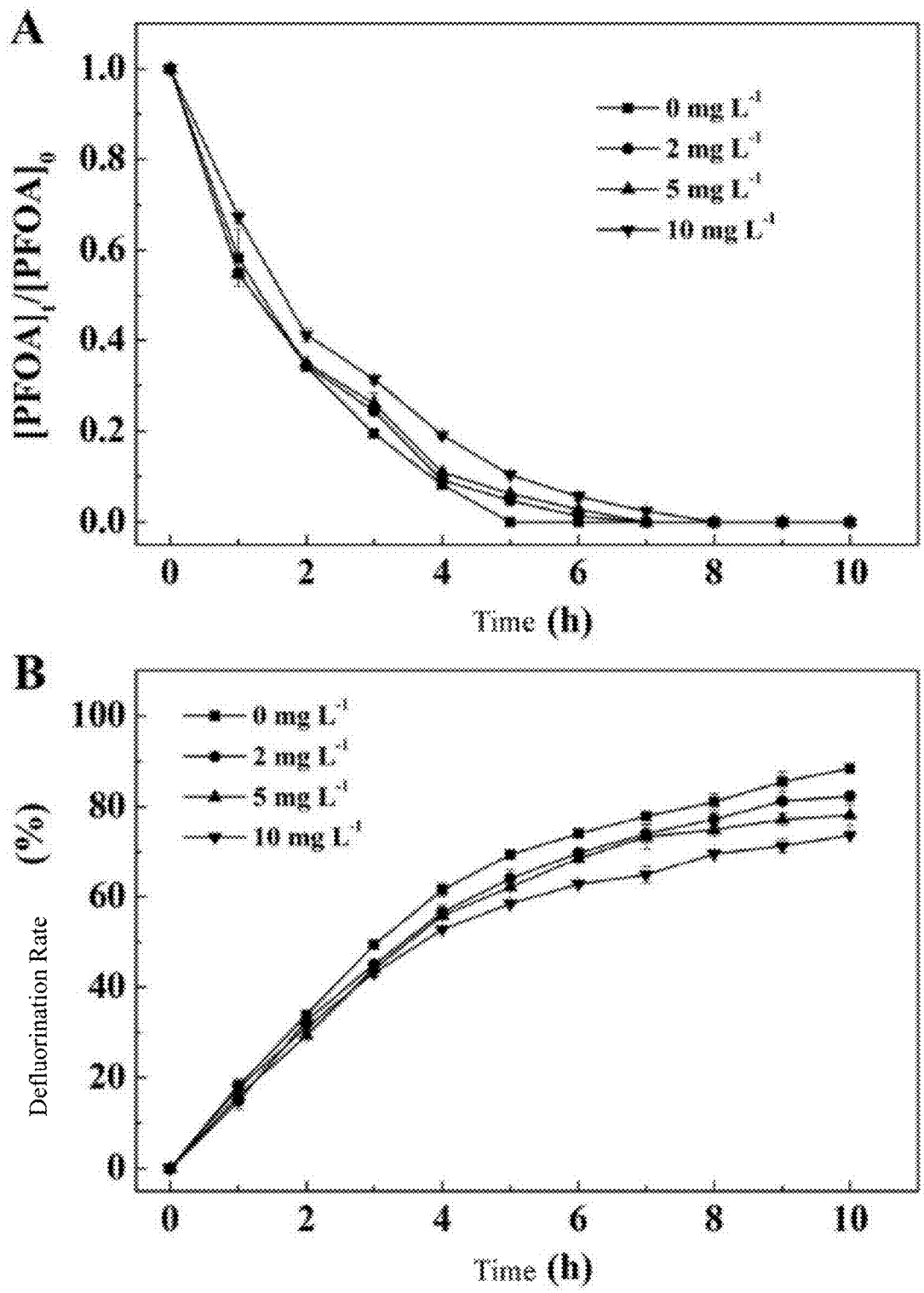
FIG. 7 shows a kinetic curve for degradation of PFOA by hydrated electrons in the presence of various concentrations of humic acid in the present disclosure.

(3) The effect of humic acid on degradation and defluorination was investigated. Before the degradation by reduction, the formulated IAA solution, and PFOA solution were mixed uniformly, and various concentrations of aqueous humic acid solutions were added according to the reaction conditions. Then, the organo-montmorillonite was dispersed in the solution and adjusted to pH 6.0 with 0.1 mmol/L NaOH and HCl. The formulated reaction solution was magnetically stirred for 30 min and then transferred to a cylindrical glass reactor. Under an aerobic condition, a low-pressure mercury lamp was immersed in the reaction solution and the degradation was initiated. The overall reaction volume was 300 mL, the reaction temperature was controlled at 25±2° C., the light source was a 36 W Philips low-pressure mercury lamp, the reaction time was 10 hrs, the concentrations of IAA and PFOA in the reaction solution were 1 mmol/L and 10 mg/L respectively, the humic acid contents were 2, 5, and 10 mg/L separately, and the concentration of the organo-montmorillonite was 2.2 g/L. 5 mL of the reaction solution was sampled every hour, The sample was divided into two portions, one portion was extracted with two-fold volume of methanol and then determined for the remaining PFOA content by HPLC, and the other portion was filtered and then determined for the content of the generated fluoride ions by IC, from which the degradation and defluorination rates of PFOA were calculated. The specific degradation and defluorination curves are shown in FIGS. 7A and 7B.

It can be concluded that the humic acid present in a water body can inhibit the degradation and defluorination of PFOA to some extent; however, the effect is relatively weak.

Example 7

(1) The commercial sodium montmorillonite (purchased from Zhejiang FengHong Clay Chemicals Co. Ltd.) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with ultrapure water, to obtain an $HDTMA^+$ loaded organo-montmorillonite.

Figure 8:
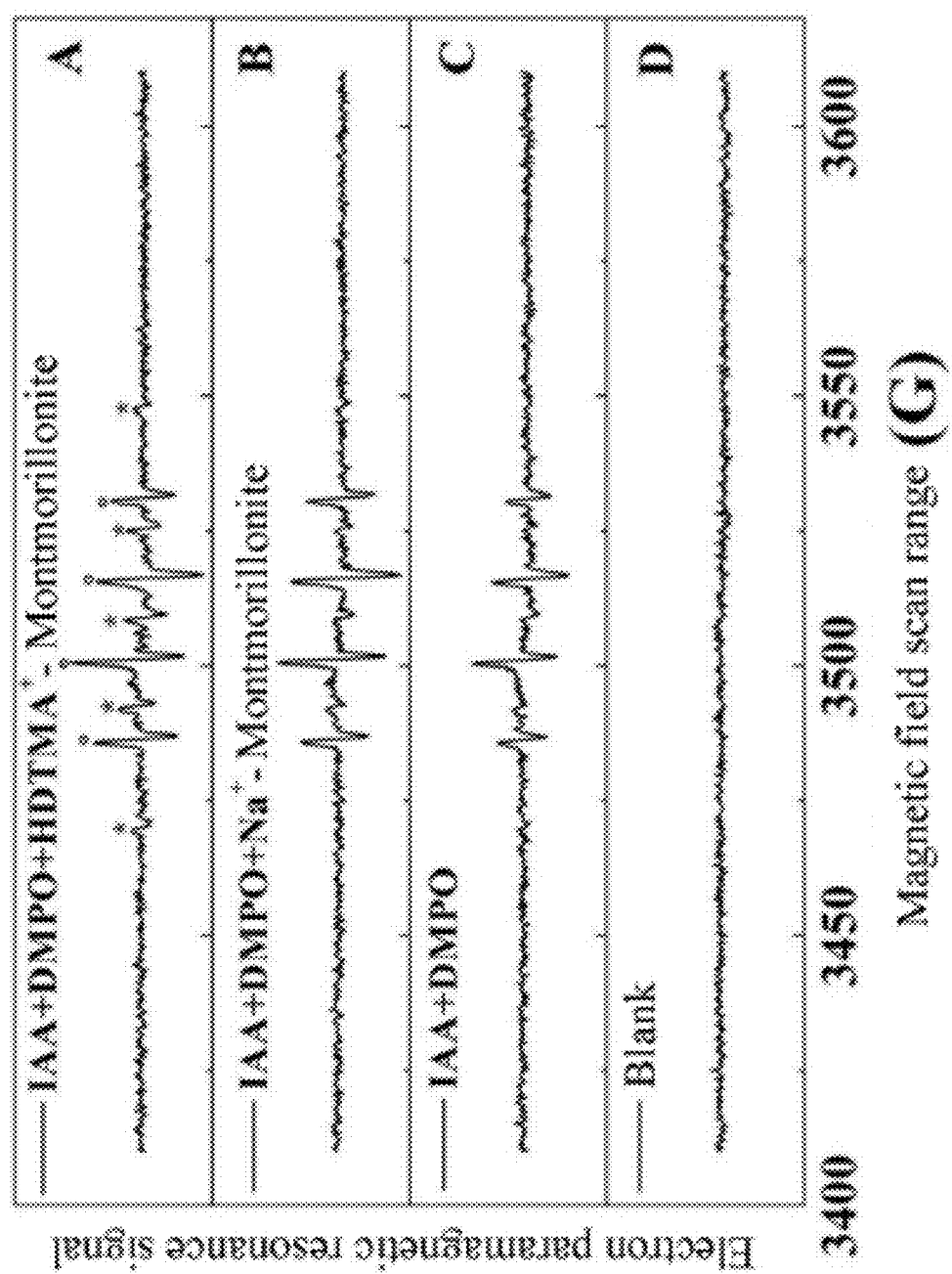
FIG. 8 shows production of hydrated electrons under various reaction conditions in the present disclosure.

(3) The formulated IAA solution was mixed with the organo-montmorillonite, transferred to a 15 mL cylindrical quartz reaction tube, and adjusted to pH 4.0 with 0.1 mmol/L NaOH and HCl. A hydrated electron scavenging agent dimethylpyridine N-oxide (DMPO) was added. The total reaction volume was 10 mL, the concentration of IAA and DMPO was 1 mmol/L and 20 mmol/L respectively, and the concentration of the organo-montmorillonite was 2.2 g/L. After the formulated sample was irradiated for 1 min using a mercury lamp, 20 μL was sampled and detected from the free radical signal by electron paramagnetic resonance (EPR). The detection results are specifically shown in FIG. 8.

It can be concluded that in case that no organo-montmorillonite is added, the generated hydrated electrons in solution are reacted immediately with oxygen and hydrogen ions to produce hydroxyl radicals, and thus no signals of hydrated electrons are detected in the sample. After the organo-montmorillonite is added, besides hydroxyl radicals, the signals of hydrated electrons are also detected in the sample, indicating that the presence of organo-montmorillonite protects the hydrated electron from being quenched through reaction with oxygen and hydrogen ions. This confirms that hydrated electrons are generated from IAA under UV irradiation; and the presence of organo-montmorillonite protects the hydrated electrons from being quenched by oxygen and hydrogen ions, thereby promoting the degradation of PFCs by hydrated electrons.

Example 8

A method for efficiently degrading a PFC was as follows.

(1) The commercial sodium montmorillonite (purchased from Zhejiang FengHong Clay Chemicals Co. Ltd.) was placed in a 0.1 mol/L NaCl solution and stirred for 8 hrs, to allow the sodium ions to saturate the montmorillonite fully, and obtain a montmorillonite adsorbed with interlamellar sodium ions. After centrifugation, the supernatant was discarded, and the precipitate was placed in a 0.1 mol/L NaCl solution again. The above process was repeated 6 times. The precipitate was washed with ultrapure water until the washing was found to have no precipitate produced, as detected by an $AgNO_3$ solution, and then freeze-dried, to obtain a $Na^+$ loaded sodium montmorillonite.

(2) The prepared $Na^+$-montmorillonite was stirred for 8 hrs in water, to disperse the montmorillonite uniformly. To the dispersed montmorillonite solution, an aqueous solution of hexadecyl trimethyl ammonium bromide in an amount equivalent to the cation exchange capacity (CEC) of the montmorillonite in the solution was added, stirred for 24 hrs, and then centrifuged. The supernatant was discarded, and the resulting precipitate was washed with ultrapure water, to obtain an $HDTMA^+$ loaded organo-montmorillonite.

Figure 9:
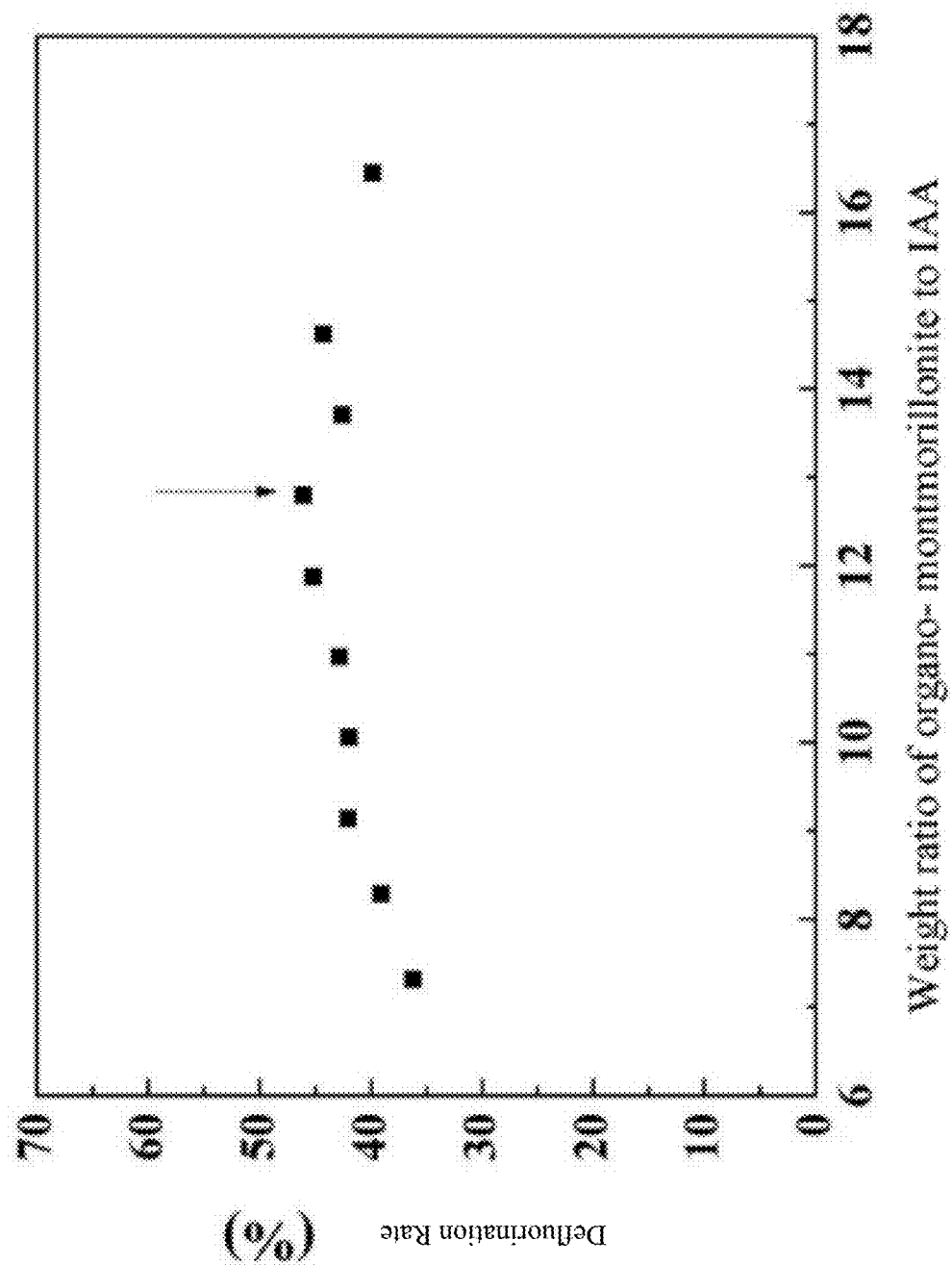
FIG. 9 shows defluorination rates of PFOA by hydrated electrons in the presence of various amounts of organo-montmorillonite in the present disclosure.

(3) The effect of the amount of organo-montmorillonite added on defluorination rate was investigated. Before the degradation, the formulated IAA solution and PFOA solution were mixed uniformly, and then various amounts of the organo-montmorillonite were dispersed in the mixed solution, wherein the weight ratio of the organo-montmorillonite to IAA is (7.5-16.6):1. The mixed solution was adjusted to pH 6.0 with 0.1 mmol/L NaOH and HCl. The formulated reaction solution was magnetically stirred for 30 min and then transferred to a cylindrical glass reactor. Under an aerobic condition, a low-pressure mercury lamp was immersed in the reaction solution and the degradation was initiated. The overall reaction volume was 300 mL, the reaction temperature was controlled at 25±2° C., the light source was a 36 W Philips low-pressure mercury lamp, the reaction time was 150 min, and the concentrations of IAA and PFOA in the reaction solution were 1 mmol/L and 10 mg/L respectively. After the reaction had been completed, 5 mL of the reaction solution was sampled. The sample was filtered and then determined for the content of the generated fluoride ions by IC, from which the defluorination rate of PFOA was calculated. The specific defluorination curve is shown in FIG. 9, in which the arrow indicates the most preferred point for defluorination in the experimental range.

What is claimed is:

1. A method for efficiently degrading a perfluorinated compound (PFC), comprising:
    (a) organically modifying montmorillonite with hexadecyl trimethyl ammonium bromide to obtain an organo-montmorillonite;
    (b) uniformly mixing a solution of the PFC to be degraded with a 3-indoleacetic acid (IAA) solution, then adding the organo-montmorillonite, and stirring to obtain a mixed solution; and
    (c) irradiating the mixed solution obtained in Step (b) by using a low-pressure mercury lamp under an aerobic condition, to enable the degradation and defluorination of the PFC.

2. The method of claim 1, wherein the organically modifying montmorillonite in Step (a) comprises:
    (1) dispersing sodium montmorillonite in water;
    (2) adding a hexadecyl trimethyl ammonium bromide solution to the dispersed solution in Step (1) and stirring;
    (3) centrifuging after the stirring in Step (2) is completed and discarding supernatant to obtain a precipitate; and
    (4) washing the precipitate obtained in Step (3) with water to obtain an $HDTMA^+$ loaded montmorillonite.

3. The method of claim 1, wherein Step (b) comprises:
    (i) uniformly mixing the IAA solution and the solution of the PFC to be treated;
    (ii) dispersing the organo-montmorillonite obtained in Step (a) in the solution in Step (i) and adjusting the pH of the solution, a weight ratio of the organo-montmorillonite to IAA being (7.5-16.6):1; and
    (iii) stirring the reaction solution in Step (ii) for 30-40 min.

4. The method of claim 1, wherein the degradation in Step (c) is carried out with the low-pressure mercury lamp immersed in the mixed solution.

5. The method of claim 2, wherein a dispersing time in Step (1) is 8 hrs.

6. The method of claim 2, wherein a total amount of hexadecyl trimethyl ammonium bromide added in Step (2) is in accord with cation exchange capacity of the montmorillonite in the solution.

7. The method of claim 2, wherein a stirring time in Step (2) is 24 hrs.

8. The method of claim 3, wherein in Step (ii), the pH of the solution is adjusted to 4.0-10.0.

9. The method of claim 4, wherein a degradation temperature is controlled at 15-35° C., a low-pressure mercury lamp is a 36 W mercury lamp, a reaction time is 1-10 hrs, and a weight ratio of IAA to PFC in the reaction solution is 17:1.

10. The method of claim 9, wherein the reactions are all carried out under an aerobic condition.

* * * * *